S. PICHLER.
LIFE PRESERVER.
APPLICATION FILED SEPT. 17, 1909.
950,240.
Patented Feb. 22, 1910.
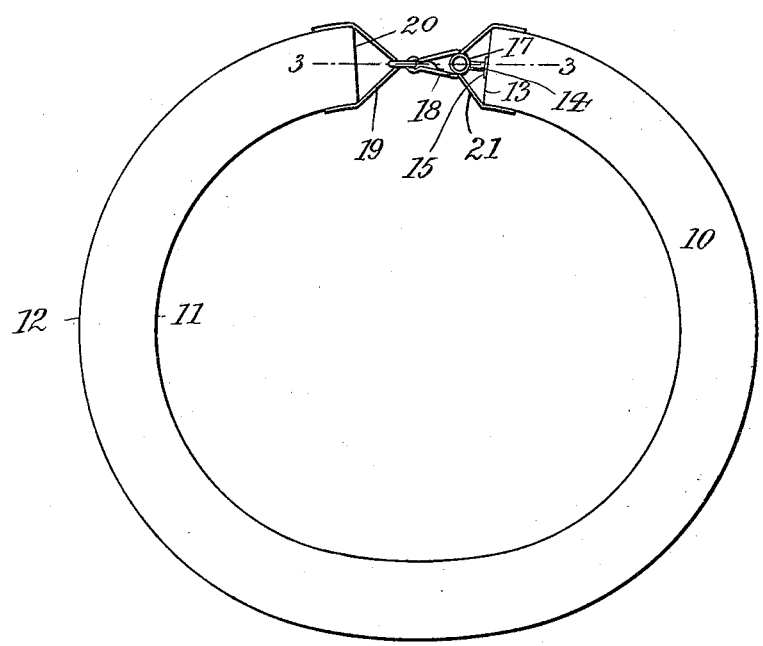
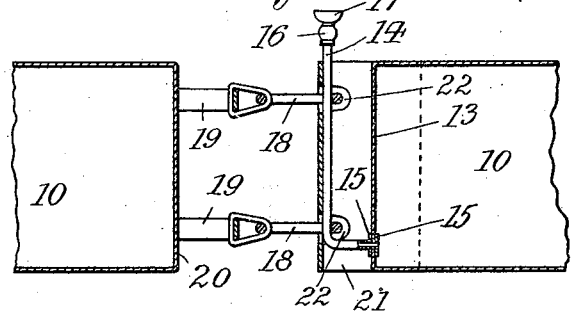
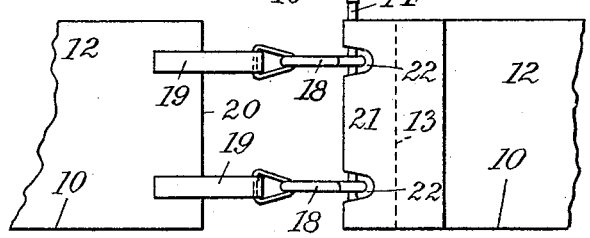

UNITED STATES PATENT OFFICE.

STEPHAN PICHLER, OF BROOKLYN, NEW YORK.

LIFE-PRESERVER.

950,240. Specification of Letters Patent. Patented Feb. 22, 1910.

Application filed September 17, 1909. Serial No. 518,137.

*To all whom it may concern:*

Be it known that I, STEPHAN PICHLER, a citizen of the German Empire, residing at Brooklyn, in the county of Kings and State of New York, have invented new and useful Improvements in Life-Preservers, of which the following is a specification.

This invention relates to an improved life-preserver of durable construction which may be readily secured in position, while it will occupy but a small space when rolled up, so that it may be conveniently carried, when out of use.

In the accompanying drawing: Figure 1 is a plan of my improved life-preserver; Fig. 2 an enlarged side view of part thereof, and Fig. 3 a vertical section on line 3—3, Fig. 1.

The numeral 10 indicates a flexible tube preferably oblong in cross section and made of silk or similar light material which is so prepared as to be rendered air-tight and water-proof. The inner wall 11 and the outer wall 12 of tube 10 are of such a length that the belt when inflated with air, assumes the annular shape illustrated in Fig. 1. One end 13 of the belt is perforated to receive the lower shank of an L-shaped inflation-pipe 14 which is secured to part 13 by disks 15 or otherwise. At its upper end, pipe 14 is provided with a back pressure valve 16 and a mouth piece 17. Pipe 14, besides providing the means for inflating tube 10, constitutes also part of the device for securing the life-preserver to the body of the wearer. For this purpose, the upright shank of pipe 14 is adapted to be engaged by a pair of snap-hooks 18 secured by straps 19 to the end 20 of belt 10. In order to prevent any displacement of pipe 14 when engaged by hooks 18, the upright shank of said pipe is held in position by a V-shaped guard 21 which is preferably made of canvas or similar material and which is cemented or otherwise secured to belt 10. Guard 21 is provided with a pair of apertures 22 so as to permit a ready engagement of the snap hooks 18 with the pipe 14.

It will be seen that my improved life-preserver, when out of use, may be readily rolled around the upright shank of pipe 14, so that the same occupies but a small space, is effectively prevented from breaking or cracking, and may be readily carried. In case of danger, belt 10 may be quickly unrolled, inflated, and secured to the body of the wearer by passing hooks 18 through openings 22 to effect an engagement of said hooks with pipe 14. The pull thus exercised on the latter will be taken up by guard 21, so that any injury to the tube is effectively prevented.

I claim:

1. A life-preserver comprising an inflatable tube, an inflation pipe communicating with one end of said tube, a back pressure valve controlling the inflation pipe, an apertured guard engaged by the pipe, and a snap-hook secured to the other end of the tube and adapted to be passed through the guard aperture for the engagement with the pipe.

2. A life-preserver comprising an inflatable tube, an inflation pipe communicating with one end of said tube, a back pressure valve controlling the inflation pipe, an apertured guard inclosing the pipe, a strap secured to the other end of the belt, and a snap-hook secured to the strap and adapted to enter the guard-aperture for the engagement with the pipe.

STEPHAN PICHLER.

Witnesses:
ARTHUR E. ZUMPE,
W. R. SCHULZ.